Figure 3:
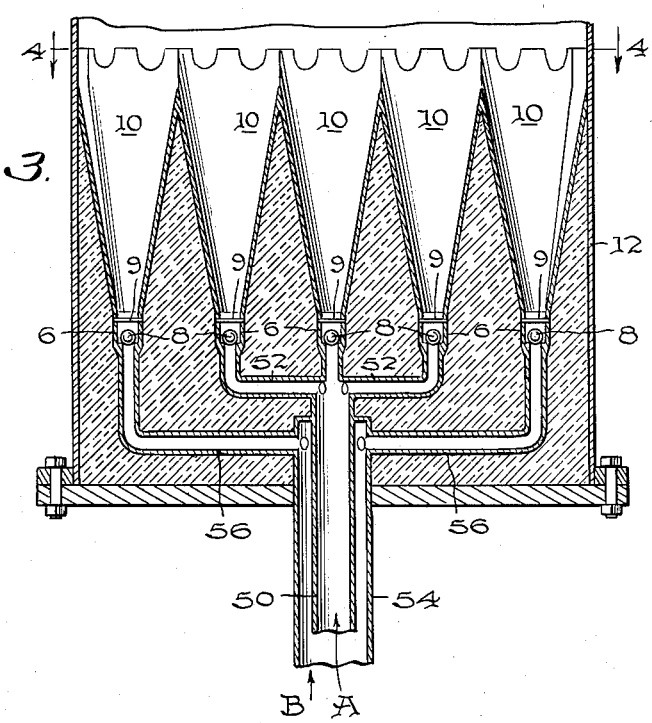

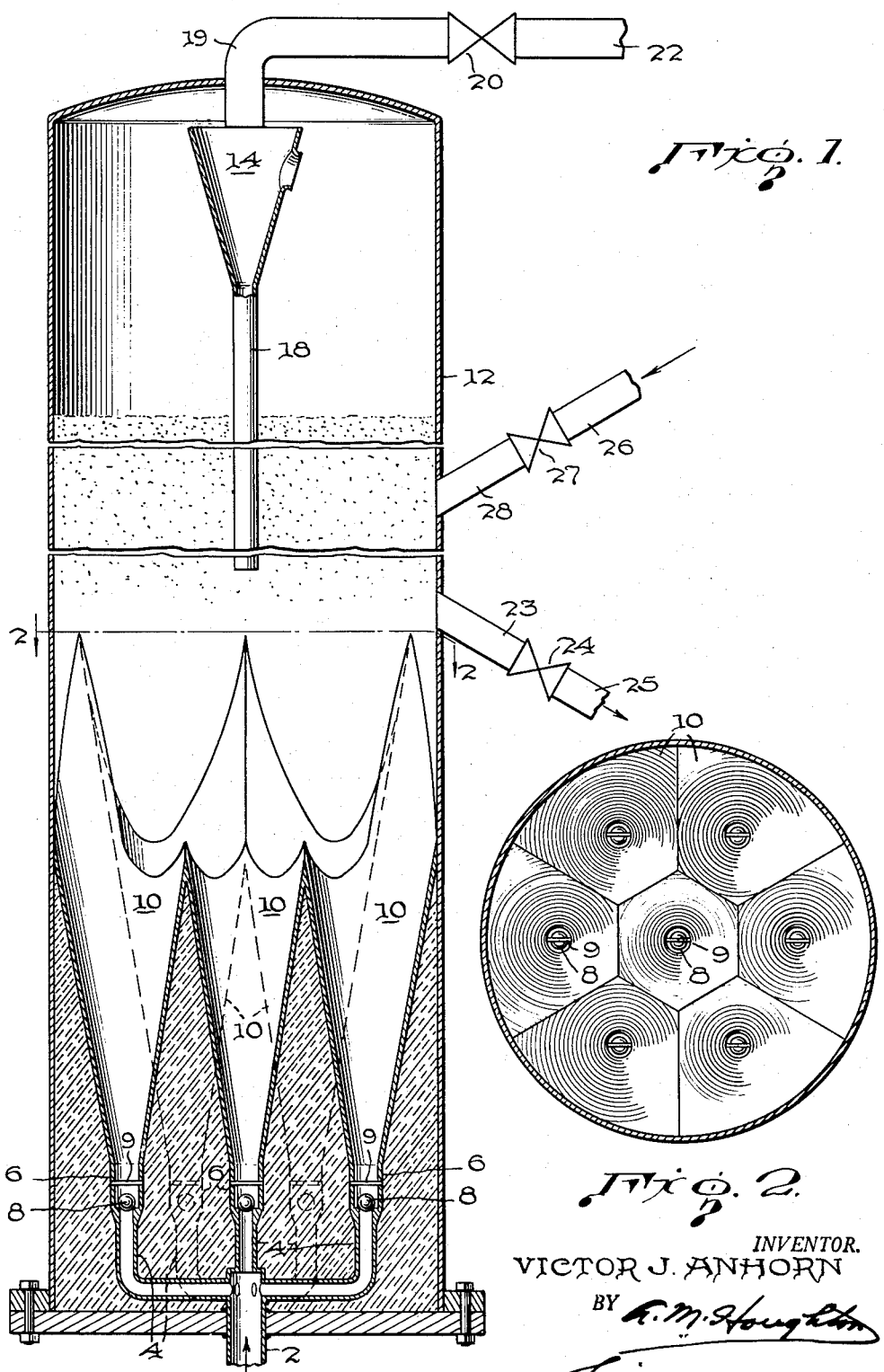

April 3, 1956   V. J. ANHORN   2,740,752
FLUID CATALYTIC PROCESS AND APPARATUS
Filed Jan. 24, 1951   2 Sheets-Sheet 2

INVENTOR.
VICTOR J. ANHORN
BY
*A. M. Houghton*
HIS ATTORNEY

United States Patent Office 2,740,752
Patented Apr. 3, 1956

2,740,752
FLUID CATALYTIC PROCESS AND APPARATUS

Victor J. Anhorn, Oakmont, Pa., assignor to Gulf Research & Development Company, Pittsburgh, Pa., a corporation of Delaware Application January 24, 1951, Serial No. 207,617

12 Claims. (Cl. 196—52)

This invention relates to an improved process and apparatus for carrying out catalytic conversions of carbonizable reactants by contact with a fluidized catalytic bed at elevated pressure and/or at low linear velocities.

The injection of hydrocarbon oil into fluidized catalytic units operated at atmospheric pressure or slightly superatmospheric pressure, e. g., as in the conventional fluid catalytic cracking units, is accomplished by charging preheated oil into a catalyst and oil inlet line through which hot regenerated catalyst is flowing.

Oil and catalyst are mixed in the inlet line by virtue of the high linear velocity of the catalyst. The oil and catalyst mixture is then introduced into the catalyst case through an orifice at the vertex of a cone-shaped bottom. The included angle of these cone-bottoms has generally varied between about 90° to 120° or greater. In these high velocity operations involving high catalyst circulation rates, the oil-catalyst mixture passes upwardly through a grating or other perforated support, after entering the cone-bottom of the catalyst case. The grating is employed to distribute the oil-catalyst mixture throughout the reactor and also to impart a measure of support to the fluid catalyst bed. The linear velocities of the vapors in the catalyst case utilized in conventional, high velocity operations are of sufficient magnitude to insure further mixing of the oil vapors and catalyst.

The use of the conventional oil charging procedures employed at atmospheric pressure is met with many difficulties in fluid catalytic systems operated at elevated pressures. If the operating pressure of the system is of significant magnitude, the amount of vaporized oil or gas required to produce linear velocities of a degree comparable to those utilized in conventional, high velocity operations, will be high because of the compression factor. In hydrocracking, for example, or reforming in the presence of hydrogen, where hydrogen is charged with the oil, gas recycle rates would be enormous, if the linear velocities usually employed at atmospheric pressure are to be obtained. It has been observed that with practical recycle gas rates satisfactory fluidization (characterized by low temperature gradients throughout the reactor) may be obtained, and satisfactory conversion levels may be maintained, although these gas rates do not produce a degree of turbulence anything like that usually associated with normal fluidization.

The maintenance of satisfactory fluidization in high pressure catalytic operations by ordinary methods is made even more difficult in the case of charge stocks which are partially in the liquid phase at reaction conditions. Obviously, the pressures utilized in the reaction tend to create or increase this portion of the charge stock. This is particularly true in the instance of heavy charge stocks. In a slow-mixing fluid catalyst bed, such as that produced by low linear gas or vapor velocities, slurrying of charge stock and catalyst is more apt to occur when a portion of the charge is liquid. Slurrying in the catalyst bed leads to coking and catalyst caking or agglomeration, which tend to destroy fluidization.

A study of the problem of introducing a carbonizable reactant into fixed fluid catalytic beds operating under pressure has indicated that several conditions must be met for successful reactant injection. First, it is desirable to contact the charge with moving catalyst as quickly as possible. For this reason no free space below a grating supporting the catalyst can be permitted. This is true, since a free space in this location is conducive to stagnant regions of catalyst when low velocity operations are being conducted. If such a free space is permitted, heavy coking occurs in the free space.

Secondly, the injection system should be so arranged that substantially no catalyst can flow back out of the zone of fluidization proper. This may ordinarily occur in high pressure operations which are being carried out in conventional apparatus during temporary pressure surges in the reactor. If backflow of catalyst in low velocity operations is permitted, stagnant catalyst accumulates below the grating. As stated previously, contacting of catalyst and charge in low velocity zones causes slurrying and rapid coking and is therefore to be avoided.

Next, the injection system should be so arranged that the force applied to the catalyst from the inlet orifice should produce a predominantly lifting action, i. e., with the absence of any substantially horizontal vector in the fluidizing vapor. This is because the force of the low velocity vapors is comparatively less than that of the fluidizing vapors in conventional high velocity operations. Consequently, what force is possessed by the low velocity vapors must be concentrated in a predominantly upward or lifting direction, in order to avoid settling out of catalyst. Also, driving action, i. e., forcing catalyst into collision with rigid obstructions such as grating, is to be avoided, since this accelerates attrition of catalyst.

Fourth, the injection system should be so designed as to produce no stagnant regions of catalyst above the inlet and within the fluidizing zone proper. Conventional fluid catalytic units which contain grids or other obstructions to gas flow and/or which employ a wide cone angle do not satisfy these requirements when operated at low pressure, since catalyst may settle out on the flat upper surfaces of the grids or on the walls of the cone bottom.

Prior investigators have recognized certain of these problems, namely the desirability of avoiding settling out of catalyst on the horizontal or nearly horizontal surfaces of a grid. These investigators have suggested as a solution the use of a grid or grating having a plurality of flared openings at its upper surface with the walls of these openings at the upper surface of the grating being contiguous with each other so as to avoid flat surfaces, and with the angle of flare of these openings being rather narrow.

This solution, however, has failed to prove satisfactory in connection with high pressure, low velocity operations, since the need to avoid coking prior to introduction of the feed into the main catalyst bed was neither recognized nor overcome. Further, all the difficulties attendant to the use of a grid remain.

It is a principal object of this invention to provide a satisfactory method and apparatus for utilization in the high pressure and/or low velocity fluid catalytic conversion of a carbonizable reactant vapor and/or liquid. A more specific object is to provide a process and apparatus which will permit of practical on-stream periods in the type of operation described above when using either a heavy or light feed stock. Further objects are to provide a process and apparatus of the type described which will avoid rapid plugging of inlet lines, which will avoid rapid coking and catalyst agglomeration in the reactor, and which will produce improved fluidization. An additional object is to provide a process and apparatus which may be employed successfully in the fluid catalytic conversion of a carbonizable reactant which is partially liquid at reaction conditions. Another object is to provide a process and apparatus which do not employ a "grid" or "grating" in the usual sense of the terms. A further object is to provide a process and apparatus which will not only substantially avoid plugging of the inlet lines but which also will operate to remove any plugging which does occur. Other objects will appear hereinafter.

These and other objects are accomplished by my invention which involves a process wherein a carbonizable reactant vapor and/or liquid is catalytically converted in a reaction zone by contact with a fluidized catalyst at elevated temperature at super-atmospheric pressure, and/or at low linear gas or vapor velocity. The invention enables the avoiding of rapid coke formation and includes in combination with the above process, the steps of passing a main stream of reactant through a confined path having a substantially smaller cross sectional area than the reaction zone, immediately dividing said main stream into a plurality of smaller streams and passing each of said smaller streams without previous expansion upwardly into the lower portion of the reaction zone which contains a body of fluidized catalyst. Each of said smaller streams is dilated through an included angle of not greater than about 22° upon initial contact with fluidized catalyst, whereby thorough intermixture of catalyst reactant vapor, and/or liquid is achieved and stagnant regions of catalyst are avoided. The dilated streams are then passed upwardly in a substantially unobstructed path into the main body of fluid catalyst. Reaction products are removed from the reaction zone while substantially all of the catalyst is retained therein. One modification of the invention may involve the provision of a plurality of main reactant streams of different composition, each of which is subdivided into a plurality of smaller streams, the smaller streams of different compositions being introduced into the reaction zone at different regions thereof. Another modification may include the step of preventing backflow of catalyst. The invention also includes suitable apparatus for carrying out the process.

Referring briefly to the attached drawing, Figure 1 is a schematic representation of a catalytic reactor in vertical section which makes use of my improved injection system. Figure 2 represents a full section of the reactor shown in Figure 1 along the line 2—2. Like numerals refer to the same elements in the corresponding views or similar elements in the same view.

While the accompanying description sets forth certain specific modifications of the invention, it is to be understood that these embodiments are by way of illustration only and are not intended as limiting.

My invention may be best understood with reference to the accompanying figures. For convenience, the description of the drawing of the invention will be made in connection with a preferred reaction, namely, hydrocracking of hydrocarbons.

Referring now to Figure 1, charge stock and hydrogen which have been previously preheated and compressed to the desired degree pass into main conduit 2 which is of substantially smaller cross sectional area than the reaction zone.

The cross-sectional area of the main conduit must be substantially smaller than that of the reaction zone, at least where no means for preventing backflow of catalyst are employed, since otherwise the cones and the inlets therein may act as a grating with all the attendant difficulties arising therefrom. By providing a main conduit having a lesser area than the reactor, any catalyst which does fall into inlet lines tends to be kicked back up into the reactor, since the vapor velocity in the narrow conduit is greater than in a conduit of large cross section.

Main conduit 2 branches off directly (with no intermediate passage of substantially greater cross-sectional area) into a plurality of inlet tubes 4 of smaller diameter. The preheated oil and hydrogen pass through inlet tubes 4, through conduits 6, and thence into the lower part of the fluid catalyst bed which is maintained in relatively elongated cones 10. The force of the oil-hydrogen mixture is sufficient to raise check-balls 8 from their respective seats and allow the passage of the oil and hydrogen between the inner surfaces of conduits 6 and the surfaces of check-balls 8.

The check-ball assemblies are positioned at approximately the vertices of the cones 10 and are provided for the purpose of preventing backflow of catalyst into the inlet tubes 4 and central conduit 2, during any temporary pressure surge in the catalyst case. The clearance between the check-balls 8 and the inner surfaces of conduits 6 should be sufficiently large to allow free passage of oil and hydrogen, but with a minimum of horizontal movement of the check-balls. If too great horizontal movement of the check-ball is allowed, grinding of catalyst results. Accordingly, this is to be avoided. The check-balls 8 are retained by pins 9 across the top of the check-ball assemblies.

In view of the rather narrow passageway between the check-balls and the inner surfaces of conduits 6, a definite pressure drop is produced between inlet tubes 4 and catalyst cones 10. Accordingly, should one check or conduit begin to plug, the increase in pressure drop through the remaining open lines tends to open the plugged tube.

Referring briefly to Figure 2, it will be seen that the cones 10 are arranged so that no appreciable horizontal flat surfaces exist. Flat surfaces are to be avoided, since they create areas of stagnant catalyst during operations carried out at elevated pressure. It should be mentioned that in a commercial reactor a substantially larger number of cones might be employed, the number illustrated being small for the sake of simplicity.

Returning to Figure 1, the oil-hydrogen vapor streams leave conduits 6 and are dilated through an included angle no greater than about 22° upon their initial contact with the lower portion of the fluid catalyst bed. The oil and hydrogen then pass from the cones upwardly in a substantially unobstructed path through the main portion of the fluid catalyst bed where further contact of the reactant vapors with catalyst is made.

It should be noted that no grid or other substantial hindrance to vapor and catalyst flow is employed. This is because such grids tend to hinder free movement of catalyst and vapors at the low linear velocities contemplated, thus creating regions of stagnant catalyst in the zone beneath. These grids or gratings do not have the same effect when employed in reactors in which the linear velocities are aprpeciably higher as, for example, in fluid catalytic cracking.

With respect to the cones 10, it has been mentioned that the included angle thereof is not substantially greater than about 22°. This is an essential feature of the invention. It has been observed that if the cone angle is less than about 22°, no stagnant catalyst areas are obtained in the catalyst bed despite the low linear velocities inherent in high pressure operations. If reactors with larger cone angles are used, catalyst caking results at the point where the cone meets the reactor wall. As pointed out hereinbefore, catalyst agglomeration or caking destroys fluidization.

It should also be noted that while the dilated or flared portions 10 of the inlet tubes 4 have been referred to as "cones," it will be observed that they are not simple individual conical sections terminating in circular bases in one horizontal plane. Instead they are segments of cones, the walls of which have been extended so as to intersect with the walls of the reactor or of adjacent cones without deviating from the angle of 22° or less selected for the cone angle. By this form of construction, gaps or horizontal surfaces between the bases of adjacent cones, or between the cones and the reactor walls, are avoided.

Returning now to the description of the process, oil vapors, hydrogen, and reaction products leave the dense phase of fluid catalyst in reactor 12 and pass into a disengaging space thereabove.

In this space a portion of the catalyst is disengaged from the vapors and drops back into the main body of catalyst. The oil vapors, hydrogen, and reaction products and some entrained catalyst particles pass into cyclone separator 14, where the bulk of the entrained catalyst is disengaged from the vapors and returned to the main catalyst bed through standpipe 18. Substantially catalyst-free vapors are then removed through line 19, valve 20 and line 22 for further conventional treatment, e. g., depressuring, condensation, removal of gases, fractionation, and the like.

The injection system illustrated, comprising cones, etc., is advantageously constructed in the manner shown, so that it may be inserted in the lower end of the reactor tube. This design makes for simple construction and easier servicing.

While the apparatus illustrated in the drawing makes use of a single main conduit, the invention is not limited thereto. In fact, a preferred form of the invention is one in which two or more main conduits are employed. This modification has the additional advantage of increased flexibility of operation; for example, each main conduit may carry a different feed, e. g., the main conduit serving the outer ring of cones may carry hydrogen, while that serving the inner cones may carry an oil-hydrogen mixture. The introduction of vapor streams of different compositions at different regions in the reaction zone is advantageous, since improved fluidization and other benefits may be obtained when using different reactants and catalysts of different compositions, densities and particle sizes or shapes. The method of introducing vapors may also be varied during the course of the reaction as the activity of the catalyst drops. The greater flexibility of operation recommends this modification as preferred.

An example of an injection system employing a plurality of main conduits is found in Figure 3. In this figure, feed "A," e. g., a preheated and compressed mixture of hydrogen and oil, enters the system through main conduit 50 from which it is immediately directed into a plurality of smaller branch lines 52. The feed "A" passes from lines 52, past check-balls 8, through passage 6, and into the vertices of cones 10.

At the same time feed "B," e. g., preheated and compressed hydrogen is introduced into the system by way of main conduit 54 from which it is directed into smaller branch lines 56. This feed passes from branch lines 56 into the vertices of the cones 10 in the outer ring and thence as described above into the catalyst bed.

Figure 4:
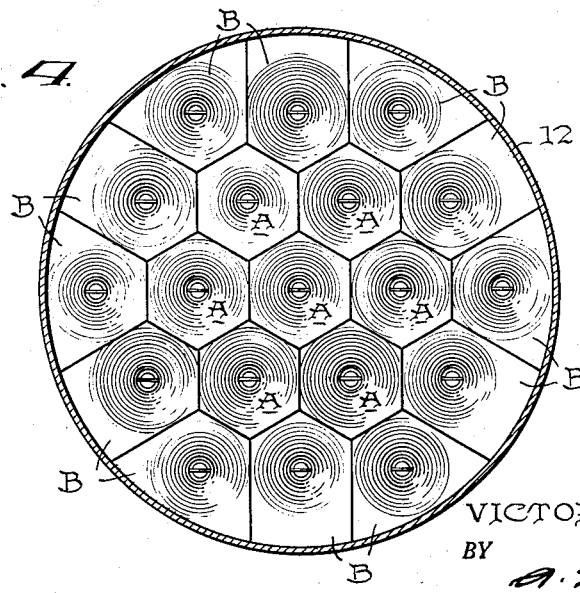

Figure 4 is a sectional plan view along the line 4—4 of Figure 3. The cones indicated with the letter "B" receive feed "B"; the cones lettered "A" receive feed "A."

The invention is of course not restricted to the particular arrangement or number of cones, or distribution means illustrated, since other satisfactory arrangements embodying the spirit of the invention will be readily apparent to those skilled in the art.

Since my invention involves the treatment of carbonizable reactants at elevated temperatures, the catalyst eventually becomes deactivated, principally because of a carbonaceous deposite on the catalyst particles. Accordingly, the catalyst may be regenerated in one of three ways:

(1) Charging of reactant may be discontinued and the catalyst regenerated in situ, (2) Catalyst may be withdrawn continuously at a very low rate through line 23, valve 24, and line 25, regenerated in a separate vessel (not shown) and returned to the reactor through line 26, valve 27, and line 28, or (3) The entire catalyst bed may be removed periodically, regenerated, and returned to the reactor through the lines indicated.

The details of catalyst regeneration are well known in the art and for this reason need not be discussed.

Alternatively, the catalyst may be removed, discarded and replaced by fresh catalyst.

In general, I consider my invention applicable to any reaction in which a carbonizable reactant is catalytically converted at elevated temperature by contact with a fluid catalyst bed at low gas or vapor velocities, and particularly to reactions of this type which are carried out at elevated pressure. By "carbonizable reactant" is meant an organic vapor and/or liquid which is decomposable at reaction conditions to form inter alia, some amount of tarry or coke-like material. These reactants may exist in gas, liquid or mixed liquid-vapor form at reaction conditions. Other non-carbonizable reactants, e. g., hydrogen are contemplated for reaction with the carbonizable reactant. Specific examples of reactions to which this invention is applicable are: hydrogenation of aldehydes, phenols, etc., and hydrocarbon synthesis. My invention is quite useful as regards the catalytic conversion of hydrocarbons. Examples of such reactions are non-destructive hydrogenation and addition-addition reaction such as polymerization. Preferred reactions of this type to which my invention is applicable are: hydrocracking or destructive hydrogenation, hydrodesulfurization, hydroforming and catalytic reforming of hydrocarbons in the presence of hydrogen.

The catalysts contemplated by my invention do not form a part of the invention and are those conventionally employed in the particular reaction being carried out. The catalysts for the various reactions are well-known; therefore, it is not considered necessary to list them in detail. However, for the purpose of illustration, a few examples of catalysts which may be employed in a preferred modification will be given. In the hydrocracking of hydrocarbons satisfactory catalysts are compounds or mixtures containing nickel, iron, cobalt, vanadium, chromium, tungsten, molybdenum, titanium and zirconium. Other catalysts known for the purpose may be used with equal facility. Catalyst supports or carriers may be utilized, if desired. The size of the catalyst particles is that normally employed in fluid catalytic reactions, e. g., between about 50 and 400 mesh.

The reaction conditions employed in the operation of my invention are those normally employed in connection with the particular reaction being carried out. These conditions are well-known in the art and need not be described in detail. For illustrative purposes it will be mentioned that destructive hydrogenation of hydrocarbons, a preferred form of the invention, may be carried out at temperatures between about 750° F. and about 1000° F. and at pressures between about 300 p. s. i. g. and about 3000 p. s. i. g. (higher pressures may also be employed) and with a hydrogen to oil ratio of between about 300 and about 20,000 s. c. f./bbl.

It should be pointed out that the linear velocities of the vapors in the reactions contemplated by this invention are relatively low and are generally in the range of between about 0.01 and about 0.1 ft./sec. While the invention is particularly useful in processes involving these linear velocities, it is not limited thereto, since substantial benefits may be obtained over any conventional technique, where difficulty with catalyst caking is experienced because of stagnation of the particles. The pressures disclosed above in connection with destructive hydrogenation produce low linear velocities such as those described.

As regards hydrocarbon oil feed stocks, light distillate stocks are preferred but the invention is particularly advantageous, since it may be employed in the catalytic conversion of heavy charge stocks such as total, reduced or topped crude petroleum oils including those of low API gravity. This is true, since these charge stocks are particularly conducive to the formation of heavy coke deposits, which deposits are minimized by this invention.

My improved process and apparatus are advantageous in that they provide a more satisfactory method of effecting the catalytic conversion of a carbonizable reactant at elevated pressure and/or low linear velocity by contact with a fluid catalyst. The invention also is of advantage in that it allows longer processing or on-stream periods in the type of reaction described.

What I claim is:

1. In a process wherein a carbonizable reactant is catalytically converted in a reaction zone by contact with a fluidized catalyst at elevated temperature and at low linear vapor velocity, the method of avoiding rapid coke formation comprising passing a main stream of reactant through a confined path having a substantially smaller cross-sectional area than the reaction zone, immediately dividing said main stream into a plurality of smaller streams, introducing each of said smaller streams without previous expansion upwardly into the lower portion of the reaction zone which contains a body of fluidized catalyst, dilating each of said smaller streams through an included angle of no greater than about 22° upon initial contact with the fluidized catalyst, whereby thorough intermixture of reactant and fluidized catalyst is achieved and stagnant regions of catalyst are avoided, passing the dilated streams upwardly into the main body of fluidized catalyst in a substantially unobstructed path, and removing reaction products from the reaction zone while retaining substantially all of the catalyst therein.

2. In a process wherein a carbonizable reactant vapor is catalytically converted in a reaction zone by contact with a fluidized catalyst at elevated temperature at superatmospheric pressure and at low linear vapor velocities, the method of avoiding rapid coke formation comprising passing a main stream of reactant vapor through a confined path having a substantially smaller cross-sectional area than the reaction zone, immediately dividing said main stream into a plurality of smaller streams, introducing each of said smaller streams without previous expansion upwardly into the lower portion of the reaction zone which contains a body of fluidized catalyst, dilating each of said smaller streams through an included angle of no greater than about 22° upon initial contact with the fluidized catalyst, whereby thorough intermixture of reactant and fluidized catalyst is achieved and stagnant regions of catalyst are avoided, passing the dilated streams upwardly into the main body of fluidized catalyst in a substantially unobstructed path, and removing reaction products from the reaction zone while retaining substantially all of the catalyst therein.

3. In a process wherein a carbonizable reactant is catalytically converted in a reaction zone by contact with a fluidized catalyst in the presence of hydrogen at elevated temperature, at a pressure of between about 300 and about 3000 p. s. i. g., the method of avoiding rapid coke formation comprising passing a main stream of reactant through a confined path having a substantially smaller cross-sectional area than the reaction zone, immediately dividing said main stream into a plurality of smaller streams, introducing each of said smaller streams without previous expansion upwardly into the lower portion of the reaction zone which contains a body of fluidized catalyst at a rate which results in a linear velocity of between about 0.01 and about 0.1 ft./sec., dilating each of said smaller streams through an included angle of no greater than about 22° upon initial contact with the fluidized catalyst, whereby thorough intermixture of reactant and catalyst is achieved, and stagnant areas of catalyst are avoided, passing the dilated streams upwardly in a substantially unobstructed path into the main body of fluidized catalyst, and removing reaction products from the reaction zone while retaining substantially all of the catalyst fluid therein.

4. In a process wherein a carbonizable reactant is catalytically converted in a reaction zone by contact with a fluidized catalyst at elevated temperature and at low linear vapor velocity, the improvement comprising establishing a main stream of reactant, dividing said main stream into a plurality of smaller streams, introducing each of said smaller streams without previous expansion upwardly into the lower portion of the reaction zone which contains a body of fluidized catalyst while preventing backflow of catalyst from the reaction zone into said streams, dilating each of said smaller streams through an included angle of no greater than about 22° upon and immediately after initial contact with the fluidized catalyst, whereby thorough intermixture of reactant and fluidized catalyst is achieved and stagnant regions of catalyst are avoided, passing the dilated streams upwardly into the main body of fluidized catalyst in a substantially unobstructed path and removing reaction products from the reaction zone while retaining substantially all of the catalyst therein.

5. In a process wherein a carbonizable reactant is catalytically converted in a reaction zone by contact with a fluidized catalyst at elevated temperature and at low linear vapor velocities, the improvement comprising passing a main stream of reactant through a confined path having a substantially smaller cross-sectional area than the reaction zone, immediately dividing said main stream into a plurality of smaller streams, introducing each of said smaller streams without previous expansion upwardly into the lower portion of the reaction zone which contains a body of fluidized catalyst while preventing backflow of catalyst from the reaction zone into said streams, dilating each of said smaller streams through an included angle of no greater than about 22° upon and immediately after initial contact with the fluidized catalyst, whereby thorough intermixture of reactant and fluidized catalyst is achieved and stagnant regions of catalyst are avoided, passing the dilated streams upwardly into the main body of fluidized catalyst in a substantially unobstructed path and removing reaction products from the reaction zone while retaining substantially all of the catalyst therein.

6. In a process wherein a carbonizable reactant is catalytically converted in a reaction zone by contact with a fluidized catalyst at elevated temperature and at low linear vapor velocities, the improvement comprising passing a first main stream of reactant having one composition through a confined path, passing a second main stream of reactant having a different composition through a different confined path, each of said confined paths having a smaller cross-sectional area than the reaction zone, immediately dividing said main streams of reactant into a plurality of smaller streams, introducing each of said smaller streams without previous expansion upwardly into the lower portion of the reaction zone which contains a fluidized catalyst, said streams of different composition being introduced at laterally adjacent regions of the reaction zone, dilating each of said smaller streams through an included angle of no greater than about 22° upon initial contact with the fluidized catalyst, whereby thorough intermixture of reactants and catalyst is achieved and stagnant regions of catalyst are avoided, passing the dilated streams upwardly into the main body of fluidized catalyst in a substantially unobstructed path, intermixing said dilated streams, and removing reaction products from the reaction zone while retaining substantially all of the catalyst therein.

7. Catalytic apparatus comprising in combination a reaction vessel adapted to contain a bed of fluidized catalyst at superatmospheric pressure, means for introducing reactant at superatmospheric pressure into the lower end of the reaction vessel, said means comprising a main reactant conduit having a substantially smaller cross-sectional area than the reaction vessel, said main conduit terminating in a plurality of smaller distributing conduits, said smaller conduits terminating in laterally adjacent, substantially unobstructed, upwardly diverging cones having included angles of no more than about 22°, said cones being oriented similarly as the major axis of the reaction vessel and the major ends thereof being closely disposed so as to occupy substantially the entire cross-sectional area of the reaction vessel, means for retaining catalyst in the reaction vessel and means for withdrawing reaction products from the vessel.

8. Catalytic apparatus comprising in combination a reaction vessel adapted to contain a bed of fluidized catalyst at superatmospheric pressure, means for introducing reactant at superatmospheric pressure into the lower end of the reaction vessel, said means comprising a main reactant conduit having a substantially smaller cross-sectional area than the reaction vessel, said main conduit terminating in a plurality of smaller distributing conduits, said smaller conduits terminating in laterally adjacent, closely disposed, substantially unobstructed, upwardly diverging cones having included angles of no more than about 22°, said cones being oriented similarly as the major axis of the reaction vessel, means for preventing appreciable backflow of catalyst into the described conduits, outlet means for withdrawing reaction products from the vessel, and means in association with the outlet means for retaining catalyst in the reaction vessel.

9. Catalytic apparatus comprising in combination a reaction vessel adapted to contain a bed of fluidized catalyst at superatmospheric pressure, means for introducing reactant at superatmospheric pressure into the lower end of the reaction vessel, said means comprising a main reactant conduit terminating in a plurality of smaller distributing conduits, said smaller conduits terminating in laterally adjacent, closely disposed, substantially unobstructed, upwardly diverging cones having included angles of no more than about 22°, said cones being oriented similarly as the major axis of the reaction vessel, means for preventing appreciable backflow of catalyst into the described conduits, outlet means for withdrawing reaction products from the vessel, and means in association with the outlet means for retaining catalyst in the reaction vessel.

10. Catalytic apparatus comprising in combination a reaction vessel adapted to contain a bed of fluidized catalyst at superatmospheric pressure, means for introducing reactant at superatmospheric pressure into the lower end of the reaction vessel, said means comprising a main reactant conduit terminating in a plurality of smaller distributing conduits, said smaller conduits terminating in laterally adjacent, closely disposed, substantially unobstructed, upwardly diverging cones having included angles of no more than about 22°, said cones being oriented similarly as the major axis of the reaction vessel, a check-ball assembly positioned approximately at the vertex of each cone comprising a check-ball, a seat for said check-ball, a conduit surrounding said check-ball and said seat, the diameter of said conduit being slightly greater than that of said check-ball, outlet means for withdrawing reaction products from the vessel, and means in association with the outlet means for retaining catalyst in the reaction vessel.

11. Catalytic apparatus comprising in combination a reaction vessel adapted to contain a bed of fluidized catalyst at superatmospheric pressure, means for introducing reactant at superatmospheric pressure into the lower end of the reaction vessel, said means comprising a plurality of main reactant conduits connected to different sources of supply and having a substantially smaller cross-sectional area than the reaction vessel, each of said main conduits terminating in a plurality of smaller distributing conduits, said smaller conduits terminating in laterally adjacent, closely disposed, substantially unobstructed, upwardly diverging cones having included angles of no more than about 22°, said cones being oriented similarly as the major axis of the reaction vessel, said smaller conduits being so arranged as to introduce the contents of each main conduit into different regions within the reaction vessel, means for retaining catalyst in the reaction vessel, and means for withdrawing reaction products from the vessel.

12. In a process wherein a carbonizable reactant is catalytically converted in a reaction zone by contact with a fluidized catalyst at elevated temperature and at low vapor velocity, the improved method of introducing reactant into the reaction zone, comprising establishing a main reactant stream having a velocity substantially greater than that in the reaction zone, dividing said main reactant stream into a plurality of smaller streams without substantial intermediate reduction in reactant velocity, directing said smaller streams without previous expansion upwardly and adjacently into the lower portion of the reaction zone, dilating each of said smaller streams through an included angle of no greater than about 22° upon initial contact with catalyst, continuing dilation of said streams until the dilated streams occupy substantially the entire cross-section of the reaction zone, then passing the dilated streams upwardly into the main portion of the reaction zone, in a substantially unobstructed path, and finally separating reaction products from catalyst.

References Cited in the file of this patent

UNITED STATES PATENTS

| Number | Name | Date |
|---|---|---|
| 2,357,901 | Lewis et al. | Sept. 12, 1944 |
| 2,409,780 | Mekler | Oct. 22, 1946 |
| 2,421,212 | Medlin | May 27, 1947 |
| 2,456,707 | Keith | Dec. 2, 1948 |
| 2,468,508 | Munday | Apr. 26, 1949 |
| 2,503,788 | White | Apr. 11, 1950 |
| 2,529,366 | Bauer | Nov. 7, 1950 |
| 2,538,235 | Coffey | Jan. 16, 1951 |
| 2,608,474 | Gilliam | Aug. 26, 1952 |